WILLIAM H. VANCE, OF NEW CORYDON, INDIANA.

*Letters Patent No. 84,322, dated November 24, 1868.*

COMPOUND FOR TREATING RING-BONE. SPAVIN, &c., IN HORSES.

The Schedule referred to in these Letters Patent and making part of the same.

*To all whom it may concern:*

Be it known that I, WILLIAM H. VANCE, of New Corydon, in the county of Jay, and in the State of Indiana, have invented a new and useful Compound; and I do hereby declare that the following is a full, clear, and exact description thereof.

The nature of the invention consists in the composition and use of the ingredients hereinafter mentioned.

To enable others skilled in the art to make and use my said invention, I proceed to describe it more fully, as follows:

Take, of Venice turpentine, three drachms, and corrosive sublimate enough to form a paste. Mix them well until a uniform paste is produced, then add twenty grains of mercury, still thoroughly stirring the mass in a mortar, and lastly ten grains of iodine, (previously rubbed up in ten drops of water.) When the compound has been mixed as before, until a uniform paste is produced, it will be ready for use.

To use my said invention for bone-spavin and ring-bone in horses, the hair is shaved off of the enlargements, and the parts washed perfectly clean. The compound is then applied upon the affected spot with a proper bandage, so that it will be held firmly in its place. The bandage and compound are to be removed every morning, three consecutive mornings, after which, remove all bandages and dressing from the affected part.

In the course of about thirty-six hours after the bandage have been removed, it will be found that the enlargement has begun to crack open at its edge, and discharge freely. In from six to nine days from the first application, the enlargement will come out entirely, leaving a cavity behind. This cavity must be washed, and oiled with olive-oil, and dressed with any convenient healing-salve. When the cavity has healed up, the horse will be found entirely cured.

What I claim, and desire to secure by Letters Patent, is—

The composition of matter herein described, when the same is prepared and used in manner and form substantially as herein set forth.

In testimony that I claim the foregoing specification, I have hereunto set my hand, this 30th day of July, 1868.

WILLIAM H. VANCE.

Witnesses:
W. W. LEATHERS,
CHAS. WERBE.